(12) United States Patent  
Ahn (10) Patent No.: US 7,505,514 B2
(45) Date of Patent: Mar. 17, 2009

(54) PHASE-COMPENSATION DECISION FEEDBACK CHANNEL EQUALIZER AND DIGITAL BROADCASTING RECEIVER USING THE SAME

(75) Inventor: Keun Hee Ahn, Incheon-si (KR)

(73) Assignee: LG Electronics Inc., Seoul (JP)

( * ) Notice: Subject to any disclaimer, the term of this patent is extended or adjusted under 35 U.S.C. 154(b) by 526 days.

(21) Appl. No.: 11/002,806

(22) Filed: Dec. 1, 2004

(65) Prior Publication Data

US 2005/0117635 A1 Jun. 2, 2005

(30) Foreign Application Priority Data

Dec. 1, 2003 (KR) .................... 10-2003-0086432

(51) Int. Cl.
*H03H 7/30* (2006.01)
*G06F 17/10* (2006.01)
(52) U.S. Cl. .................... 375/233; 708/323
(58) Field of Classification Search ............. 375/232, 375/233, 350, 346; 708/322, 323
See application file for complete search history.

(56) References Cited

U.S. PATENT DOCUMENTS

| 5,712,873 | A  | * | 1/1998  | Shiue et al. | 375/233 |
| 6,259,320 | B1 | * | 7/2001  | Valk et al.  | 330/149 |
| 6,493,409 | B1 | * | 12/2002 | Lin et al.   | 375/375 |
| 6,947,497 | B1 | * | 9/2005  | Ahn          | 375/326 |
| 2002/0176524 | A1 | * | 11/2002 | Popper et al. | 375/346 |

FOREIGN PATENT DOCUMENTS

KR  1996-0043917  12/1996
KR  1998-0004315  3/1998

* cited by examiner

*Primary Examiner*—Young T Tse
(74) *Attorney, Agent, or Firm*—Lee, Hong, Degerman, Kang & Waimey (57) ABSTRACT

There are provided a phase-compensation decision feedback channel equalizer. The phase-compensation decision feedback channel equalizer equalizes phases of signals outputted from a feedforward filter and a feedback filter regardless of a phase distorted by a carrier wave and a ghost, thereby satisfying the same ghost removal performance.

14 Claims, 9 Drawing Sheets

PHASE-COMPENSATION DECISION FEEDBACK CHANNEL EQUALIZER AND DIGITAL BROADCASTING RECEIVER USING THE SAME

This application claims the benefit of the Korean Application No. 10-2003-0086432 filed on Dec. 1, 2003, which is hereby incorporated by reference.

BACKGROUND OF THE INVENTION

1. Field of the Invention

The present invention relates to a digital broadcasting apparatus, and more particularly, to a phase-compensation decision feedback equalizer for removing a frequency offset and a phase jitter of a carrier wave and demodulating a passband digital signal into a baseband digital signal.

2. Discussion of the Related Art

A digital broadcasting reception technology has been developed in several forms of media (ground wave, cable, satellite). Meanwhile, the digital broadcasting reception technology is now developing in a form of an integration system for the integrated digital broadcasting.

Specifically, since a transmission system of an HDTV transmits a data having a high bit rate (more than 20 Mb/s) through a band-limit of 6 MHz, a modulation/demodulation method having good bandwidth efficiency is required. Also, a symbol/carrier recovery method for recovering a symbol and a carrier wave and a channel equalizer for compensating for abnormal channel characteristics such as a multi-path and a Doppler effect are required. A channel demodulation method having a good efficiency is used to reliably transmit data with respect to noise.

An integrated "multi-channel digital broadcasting receiver" is largely classified into three receiving system.

1) Ground wave broadcasting receiving system:
  VSB (vestigial sideband, SSB, ATSC, American method)
  OFDM (Orthogonal Frequency Division Multiplexing, DSB, European method)
2) Cable broadcasting receiving system
  QAM (Quadrature Amplitude Modulation, DSB)
3) QPSK (Quadrature Phase Shift Keying, DSB)

The three receiving systems are implemented with different technologies, such as an analog reception, a signal synchronization, a channel equalization, a matched filter and a channel demodulation.

However, there is a demand for development of a "multimedia digital broadcasting receiver" that is optimized by selecting sharable functions among those technologies.

The multimedia digital broadcasting receiver will be described with reference to FIG. 1.

Figure 1:
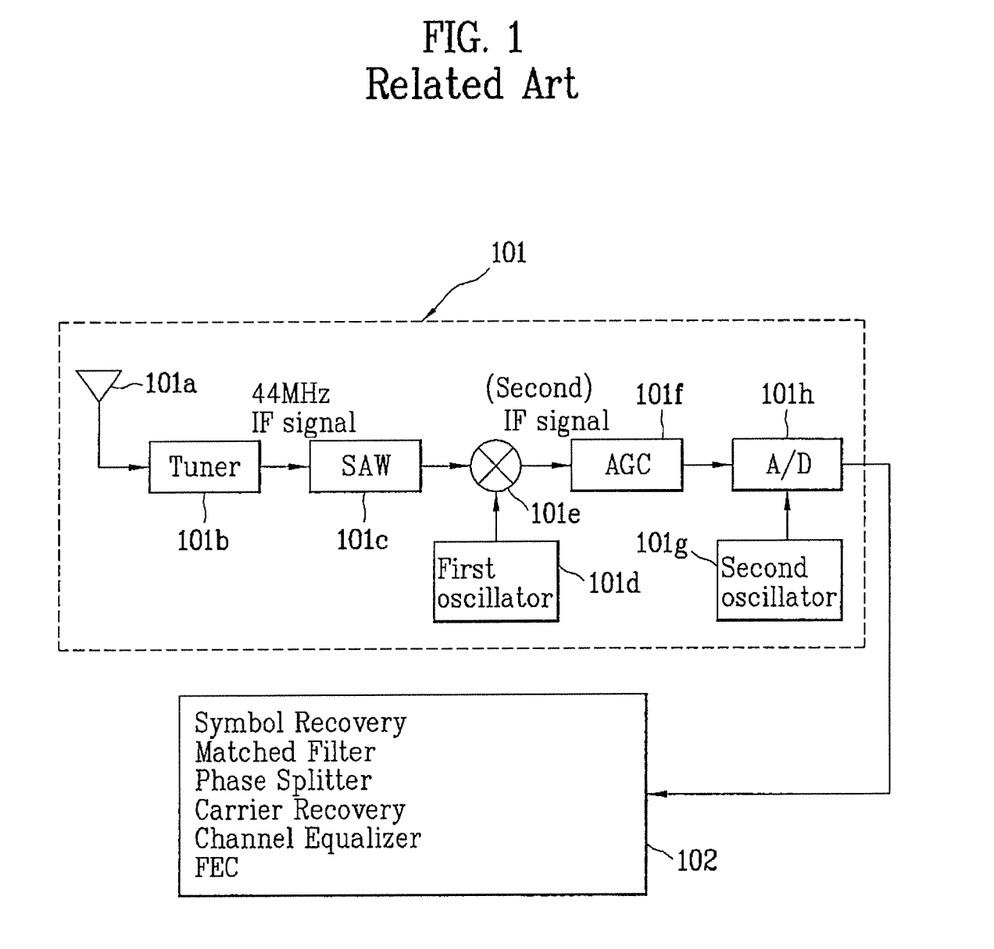
FIG. 1 is a block diagram of a general multimedia digital broadcasting receiver.

FIG. 1 is a block diagram of a general multimedia digital broadcasting receiver. Referring to FIG. 1, the multimedia digital broadcasting receiver includes an analog receiving part 101 for converting a radio frequency (RF) signal into an intermediate frequency (IF) signal, and a digital demodulating part 102 for demodulating a digital signal that is converted by an analog-to-digital converter.

In the analog receiving part 101, an RF signal of 50-860 MHz is received through a tuner 101b and converted into an IF signal. The converted signal is converted into a digital signal by the analog-to-digital converter 101h and transmitted to the digital demodulating part 102.

The analog receiving part 101 includes: a tuner 101 for receiving an RF signal of 50-860 MHz through an antenna 101a and converting it into a first IF signal of 44 MHz; a surface acoustic wave (SAW) filter 101c for filtering an output signal of the tuner 101b; a first oscillator 101d for generating an oscillation frequency used to generate a second IF signal; a mixer 101e for converting the filtered signal into a second IF signal by down-converting the filtered signal to the oscillation frequency of the first oscillator 101d; an automatic gain control (AGC) amplifier 101f for compensating for a gain of the second IF signal; a second oscillator 101g for generating a sampling frequency; and an analog-to-digital converter 101h for converting the amplified signal into a digital signal, based on the sampling frequency generated from the second oscillator 101g.

At this point, the analog receiving part 101 has a fixed structure shown in FIG. 1, regardless of the demodulation methods.

On the other hand, the digital demodulating part 102 has various structures depending on the modulation methods (VSB, OFDM, QAM, QPSK, etc.). A symbol recovery, a matched filter, a phase splitter, a carrier recovery, a channel equalizer and an FEC are used as basic elements.

The symbol recovery is fed back with a timing error of current symbols by using a resampler, and interpolates the digital signal outputted from the analog-to-digital converter 101h so as to reduce a signal error and then transmits it to the matched filter.

In the symbol recovery, a process of converting an analog data into a digital data by using a fixed frequency and a process of recovering a clock of all symbol sequence are preformed in a digital domain. Therefore, other analog devices except the analog-to-digital converter are not needed such that the symbol recovery can be simplified and a device noise can be removed.

The matched filter filters a signal outputted in synchronization with a symbol at the symbol recovery and re-adjusts a signal to noise ratio (SNR) to the maximum. A reception filter theoretically has a rectangular bandwidth characteristic and cannot implement a shape of a reception filter having an infinite time delay. Accordingly, the detection process at a system having such a characteristic is sensitive to a very slight timing error. Although an inter-symbol influence at an accurate sampling time can be avoided, an inter-symbol interference occurs when a slight error exists. Thus, an excess bandwidth is required in order to implement the system. For this purpose, the matched filter is used.

The phase splitter separates the output of the matched filter into a real part and an imaginary part, that is, I signal and Q signal, and then transmits them to the carrier recovery part.

The carrier recovery part removes a frequency offset and phase jitter caused by the tuner 101a and the mixer 101d. Also, the carrier recovery part demodulates the passband digital signal into the baseband digital signal.

The channel equalizer removes an inter-symbol interference.

That is, in the digital transmission system such as an HDTV, distortion occurring while the transmission signal passes through the multi-path channel, interference due to an NTSC, or distortion in the transceiver system causes a bit detection error in a receiver side. Specifically, since signal propagation through the multi-path causes an inter-symbol interference (ISI), it is a main cause of the bit detection error. In order to solve it, the channel equalizer is used.

The FEC uses an RS encoding and a grid modulation encoding to remove a burst noise and sporadic noise, which exist on a channel contained in a signal whose inter-symbol interference is removed. Then, the FEC recovers a synchronizing signal inserted in the transmission from the baseband signal, and the received data (that is, the transmission symbol) is recovered using the synchronizing signal.

The phase-compensation decision feedback channel equalizer will be described below in detail.

The phase-compensation decision feedback channel equalizer used in the transmission system of the HDTV removes a ghost occurring while the transmission signal passes through the multi-path channel, interference due to an NTSC, or distortion in the transceiver system, which causes a bit detection error in a receiver side. Specifically, the phase-compensation decision feedback channel equalizer compensates for a main cause of the bit detection error, which generates an inter-symbol interference (ISI) of the transmission signal.

Figure 2:
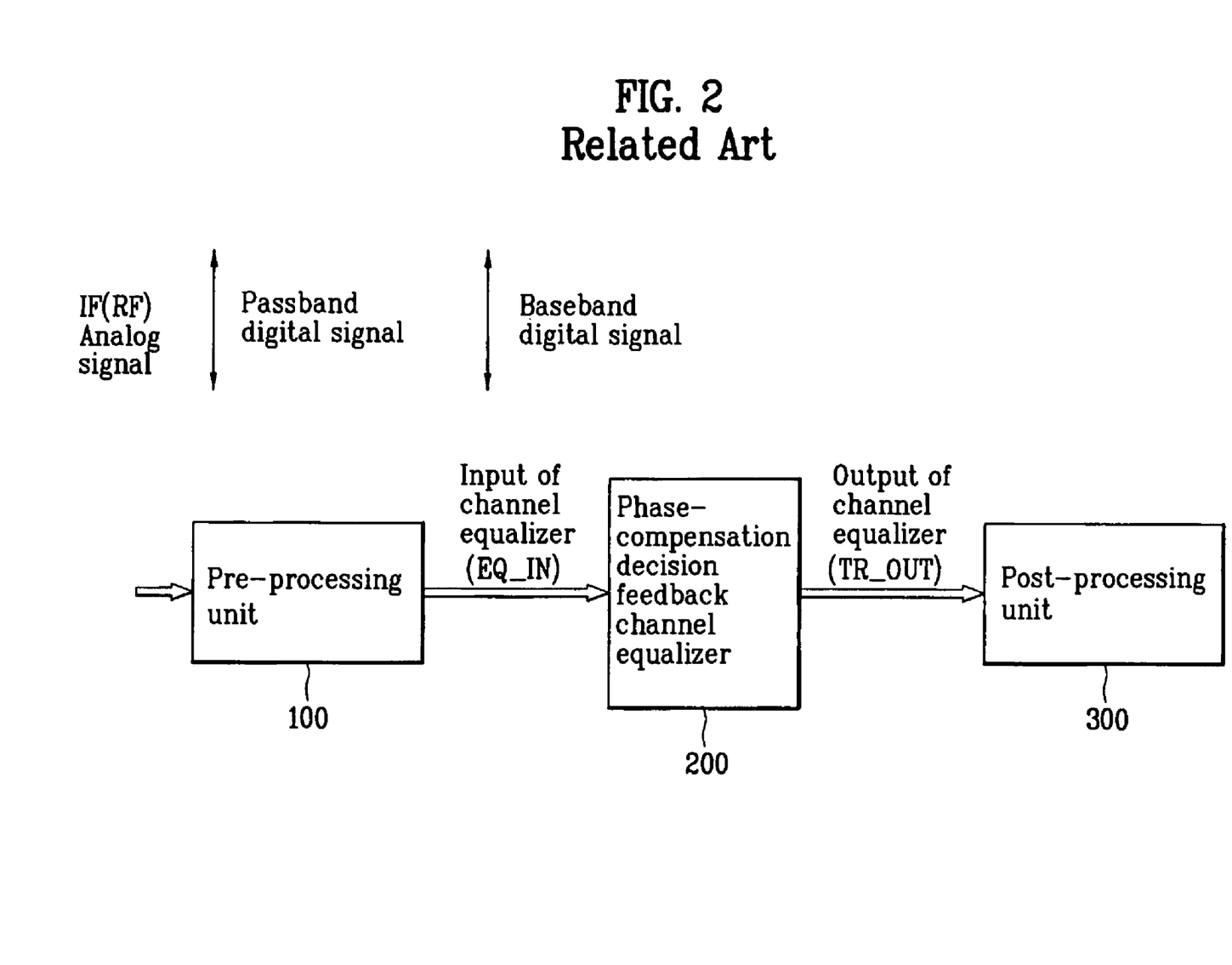
FIG. 2 is a block diagram of a digital broadcasting receiver having a phase-compensation decision feedback channel equalizer.

FIG. 2 is a block diagram of a digital broadcasting receiver having a phase-compensation decision feedback channel equalizer. The digital broadcasting receiver includes a pre-processing unit 100, a phase-compensation decision feedback channel equalizer 200, and a post-processing unit 300, which are disposed in this order.

The pre-processing unit 100 converts a passband digital signal into a baseband digital signal and outputs the baseband digital signal to the phase-compensation decision feedback channel equalizer 200.

The phase-compensation decision feedback channel equalizer 200 compensates for a ghost occurring while the baseband digital signal passes through the channel, interference due to an NTSC, or distortion in a transceiver system, which causes a bit detection error in a receiver side. Specifically, the phase-compensation decision feedback channel equalizer 200 compensates for a main cause of the bit detection error, which generates an inter-symbol interference (ISI) in the signal propagation through the multi-path. Then, the phase-compensation decision feedback channel equalizer 200 outputs the baseband digital signal, whose noise is removed, to the post-processing unit 300. The post-processing unit 300 removes a noise existing on the channel and recovers the transmission symbol.

Figure 3:
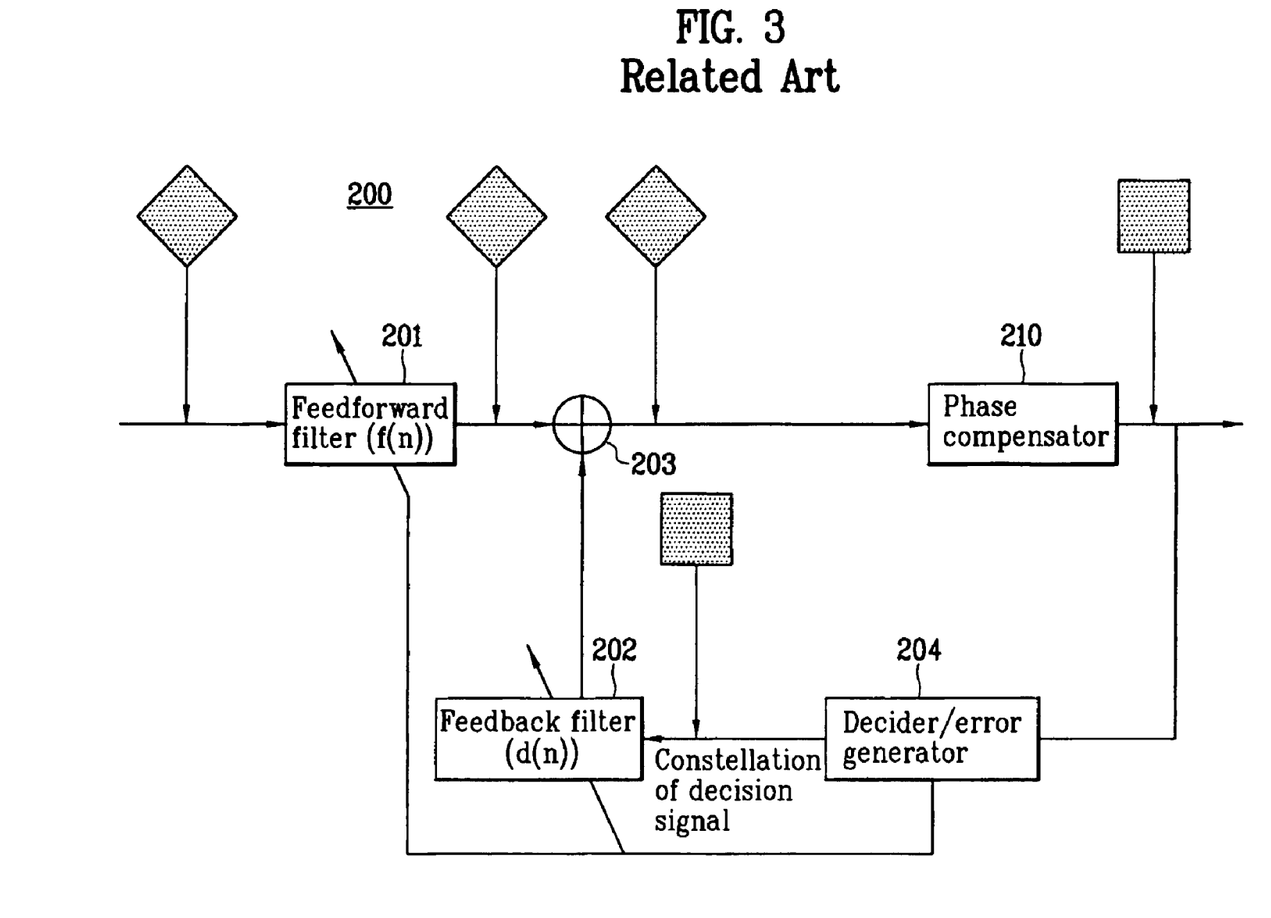
FIG. 3 is a block diagram of a conventional phase-compensation decision feedback channel equalizer.

FIG. 3 is a block diagram of a conventional phase-compensation decision feedback channel equalizer 200. The conventional phase-compensation decision feedback channel equalizer includes a feedforward filter 201, a feedback filter 202, an adder 203, and a decider/error generator 204.

An output of the decision feedback channel equalizer is a baseband signal where a phase of a carrier wave and a phase of a ghost exist together, and a constellation of a signal inputted to the feedforward filter 201 is inclined by a residual phase and transmitted to an input of the feedforward filter 201. Meanwhile, then input of the feedback filter is a decision signal constellation produced by slicing the output of the phase compensator 210. At this point, the constellation of the signal inputted to the feedback filter 202 is compensated by the phase compensator and thus shows an upright constellation without any distortion.

The adder adds the output signal having the inclined phase to the output signal having the upright phase. An output of the adder causes the distortion of the constellation due to different phases, and thus the signal having the distorted constellation is outputted.

Consequently, the constellation degraded due to the residual phase shows a constellation similar to the residual phase of the phase-compensation decision feedback channel equalizer. The residual phase is compensated by the phase compensator, such that it has an upright constellation.

In the digital broadcasting receiver, an input constellation of the feedback filter 202 in the decision feedback channel equalizer generates a phase error as much as the output constellation of the feedforward filter 201 and the residual phase. Since this phase error is added to the two constellations, the performance in the final channel compensation of the channel equalizer varies with the phase of the carrier wave and the phase of the ghost. Consequently, the entire ghost removal performance is degraded.

SUMMARY OF THE INVENTION

Accordingly, the present invention is directed to a phase-compensation decision feedback channel equalizer and a digital broadcasting receiver using the same that substantially obviates one or more problems due to limitations and disadvantages of the related art.

An object of the present invention is to provide a phase-compensation decision feedback channel equalizer and a digital broadcasting receiver using the same, capable of satisfying the same ghost removal performance regardless of a phase of a carrier frequency and a phase of a ghost.

Another object of the present invention is to provide a phase-compensation decision feedback channel equalizer and a digital broadcasting receiver using the same, capable of preventing degradation of a capturing/tracing performance with respect to ISI/ghost channels due to a phase difference between a carrier frequency and a ghost.

A further another object of the present invention is to provide a phase-compensation decision feedback channel equalizer and a digital broadcasting receiver using the same, capable of preventing degradation of an entire ghost removal performance by equalizing a phase of a constellation of a decision signal of a feedback filter and a phase of constellation of an input signal of a feedforward filter so as to recover a baseband signal where a phase of a carrier wave and a phase of a ghost exist together.

A still further another object of the present invention is to provide a phase-compensation decision feedback channel equalizer, capable of preventing an increase of a hardware size due to the increase in the number of taps used in a feedback filter by decreasing the number of bits used for input signals of the feedback filter while maintaining a capturing/tracing function with respect to ISI/ghost channel due to a phase difference between a carrier frequency and a ghost, which is supported by an existing phase-compensation decision feedback channel equalizer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a phase-compensation decision feedback channel equalizer including: a feedforward filter for removing an error estimated value detected from an input signal having a phase distortion; a feedback filter for removing an inter-symbol interference from a decision constellation whose phase distortion component is removed from a detected estimated value of a current input signal; and a phase compensator for equalizing a phase of the decision constellation of the feedback filter and a phase of the input signal of the feedforward filter.

The phase compensator multiplies a decision constellation having no phase distortion by a compensation phase, outputs a resulting signal to the feedback filter to thereby allow the feedback filter to output a decision constellation signal having a phase distortion, and adds the decision constellation signal to an output signal of the feedforward filter having a phase distortion.

The phase compensator outputs a decision constellation having no phase distortion to the feedback filter to thereby allow the feedback filter to output a decision constellation signal having no phase distortion, and adds the decision constellation signal to an output signal of the feedforward filter, which is compensated to have no phase distortion by a multiplication of a compensation phase.

According to another aspect of the present invention, there is provided a phase-compensation decision feedback channel equalizer including: a feedforward filter for removing an error estimated value detected from an input signal having a distortion due to a phase by using a previous signal; a feedback filter for removing an inter-symbol interference from a decision constellation whose distortion component due to a phase is removed from a detected estimated value of a current input signal detected by using the previous signal; and a phase compensator for removing the distortion due to the phase from an output signal of the feedforward filter and outputs a resulting signal to an exterior, generating a decision constellation having the same phase as a constellation of the output signal of the feedforward filter, and outputting the decision constellation to the feedback filter.

The phase compensator generates an error estimated value from the external output signal and outputs the error estimated value to the feedforward filter and the feedback filter.

The phase compensator multiplies a decision constellation having no phase distortion by a compensation phase and outputs a decision signal to the feedback filter.

The decision signal inputted to the feedback filter is 12 bits.

The phase compensator includes: a phase tracer for removing a phase distortion from the output signal of the feedforward filter; a decision constellation/compensation phase/error generator for generating a compensation phase to compensate the phase distortion contained in the output signal of the feedforward filter, the decision constellation and the error estimated value from the output signal of the phase tracer; and a decision constellation phase compensator for multiplying the compensation phase by the decision constellation to generate a decision signal having the same phase distortion as the input signal of the feedforward filter, and providing the decision signal to the feedback filter.

The phase-compensation decision feedback channel equalizer may further include an adder for adding the output signal of the feedforward filter to the output signal of the feedback filter and outputting the added signal to the phase compensator.

The phase tracer conjugates the compensation phase outputted from the decision constellation/compensation phase/error generator and multiplies a conjugated value of the compensation phase by an output signal of the adder.

The phase compensator includes: a phase tracer for removing a phase distortion from the output signal of the feedforward filter; an adder for adding an output signal of the phase tracer to the output signal of the feedback filter and outputting the added signal to an exterior; and a decision constellation/compensation phase/error generator for generating a compensation phase to compensate the phase distortion contained in the output signal of the feedforward filter, the decision constellation and the error estimated value from the output signal of the adder.

The phase tracer conjugates the compensation phase outputted from the decision constellation/compensation phase/error generator and multiplies a conjugated value of the compensation phase by the output signal of the feedforward filter.

The decision constellation/compensation phase/error generator includes: a sign extractor for extracting a sign of the externally output signal whose phase distortion is removed; a compensation phase generator for conjugating the decision constellation and multiplying the conjugated value of the decision constellation by the externally output signal to generate the compensation phase; and an error generator for subtracting the decision constellation from the externally output signal to generate the error estimated value.

The signal extractor is configured with a limiter.

The decision signal inputted to the feedback filter is 5 bits.

According to a further another aspect of the present invention, there is provided a digital broadcasting receiver including: a pre-processing unit for converting a passband digital signal into a baseband digital signal; the phase-compensation decision feedback channel equalizer having the structure claimed in claim 1; and a post-processing unit for removing noise existing on a channel and recovering a transmission symbol.

The digital broadcasting receiver is any one of a cable digital receiver, a satellite digital receiver and a ground wave digital receiver.

The digital broadcasting receiver is any one of a single QAM cable digital receiver, a single QPSK satellite digital receiver, a single 8PSK satellite digital receiver, a multi QAM cable digital receiver, a multi QPSK satellite digital receiver, a multi 8PSK satellite digital receiver and a VSB ground wave digital receiver.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIRST EMBODIMENT

Figure 4:
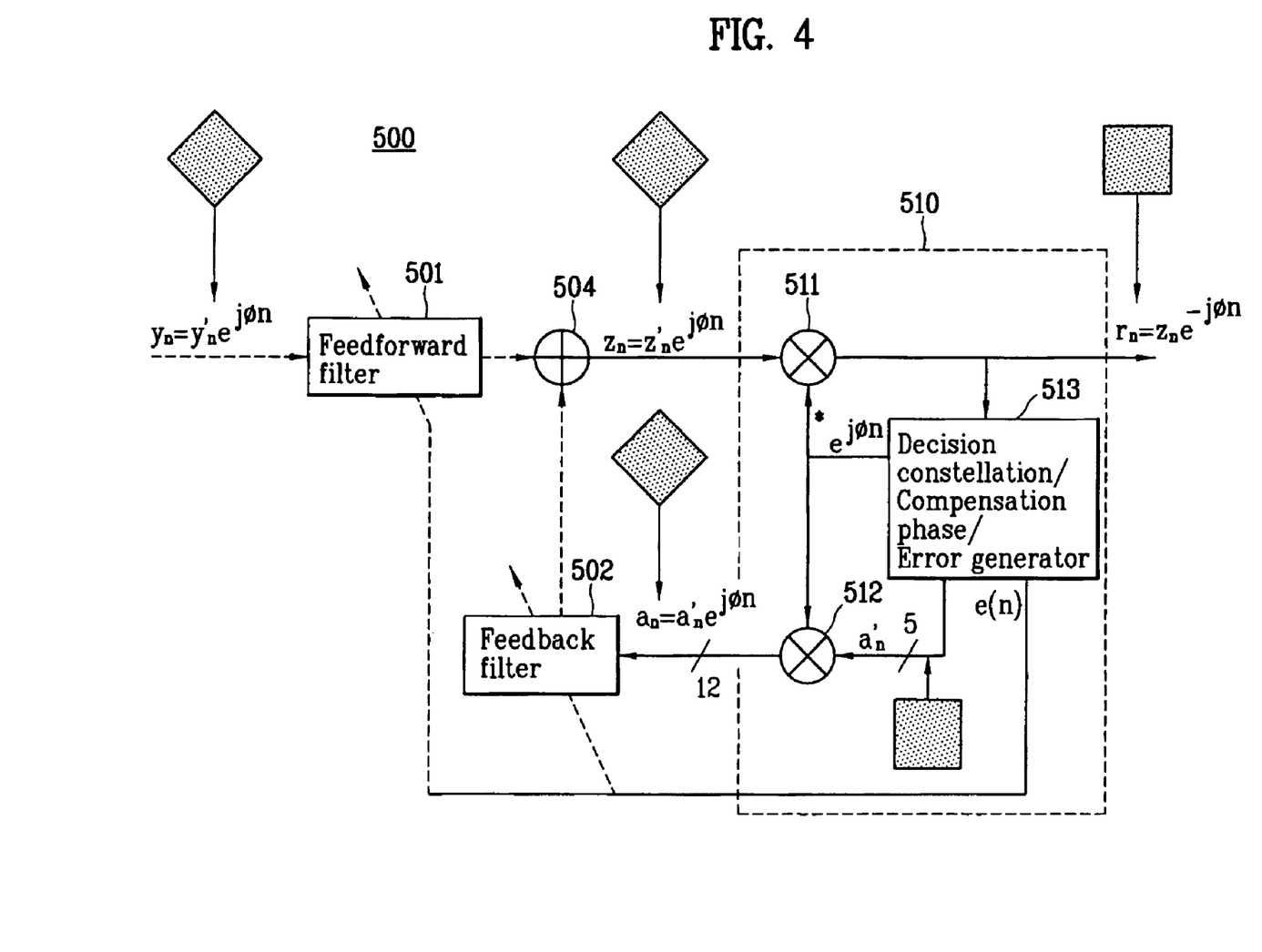
FIG. 4 is a block diagram illustrating a structure of a digital broadcasting receiver having a phase-compensation decision feedback channel equalizer according to a first embodiment of the present invention.

FIG. 4 is a block diagram illustrating a structure of a digital broadcasting receiver having a phase-compensation decision feedback channel equalizer according to a first embodiment of the present invention.

Referring to FIG. 4, the phase-compensation decision feedback channel equalizer includes the feedforward filter 501, a feedback filter 502, an adder 504, and a phase compensator 510.

The feedforward filter 501 removes an error detected from a current input signal $y_n = y'_n e^{j\Phi n}$ up to a previous signal received from the pre-processing unit 100. The feedback filter 502 removes a portion where an inter-symbol interference occurs from a decision signal $a_n = a'_n e^{j\Phi n}$, a current estimated value generated by symbols detected previously.

At this point, an input signal $y_n = y'_n e^{j\Phi n}$ from the pre-processing unit 100 is inputted to the feedforward filter 501 and distorted as much as $e^{j\Phi n}$ by a carrier phase and a ghost phase. A decision signal $a_n = a'_n e^{j\Phi n}$ which is inputted to the feedback filter 502 is also inputted to the feedback filter 502 out of the phase as much as $e^{j\Phi n}$.

The adder 504 adds an output signal of the feedforward filter 501 and an output signal of the feedback filter 502 to output to the phase compensator 510.

The phase compensator 510 receives $Z_n = Z'_n e^{j\Phi n}$, which is an output signal of the adder 203, compensates a phase distortion and generates an output signal $r_n = Z_n e^{-j\Phi n}$ to a post-processing unit 300, and generates a decision signal $a_n = a'_n e^{j\Phi n}$ to the feedback filter 502.

The phase compensator 510 includes a phase tracer 511, a decision constellation phase compensator 512 and a decision constellation/compensation phase/error generator 513.

The phase tracer 511 conjugates a compensation phase $e^{j\Phi n}$ outputted from the decision constellation/compensation phase/error generator 513 and multiplies the conjugated compensation phase $e^{j\Phi n}$ by the $Z_n = Z'_n e^{j\Phi n}$, which is an output signal of the adder 504. That is, the phase tracer 511 perform an operation of $Z_n \times (e^{j\Phi n})^*$.

Since $Z_n = Z'_n e^{j\Phi n}$, a result of the operation becomes $Z'_n e^{j\Phi n} \times (e^{j\Phi n})^* = Z'_n$, so that a distortion due to a phase is removed.

That is, $r_n = Z_n e^{-j\Phi n} = Z'_n$ that is an output signal of the phase compensator 510 is compensated in its distortion due to a phase so that the $r_n = Z_n e^{-j\Phi n} = Z'_n$ has an upright constellation and such an output signal of the phase compensator 510 is outputted to the post-processing unit 300.

The decision constellation phase compensator 512 multiplies a compensation phase $e^{j\Phi n}$ outputted from the decision constellation/compensation phase/error generator 513 by a decision constellation $a'_n$ to generate a decision signal $a_n = a'_n e^{j\Phi n}$ that has the same phase distortion as the an input signal $y_n = y'_n e^{j\Phi n}$ of the feedforward filter 501 and provide the decision signal to the feedback filter 502.

Figure 8:
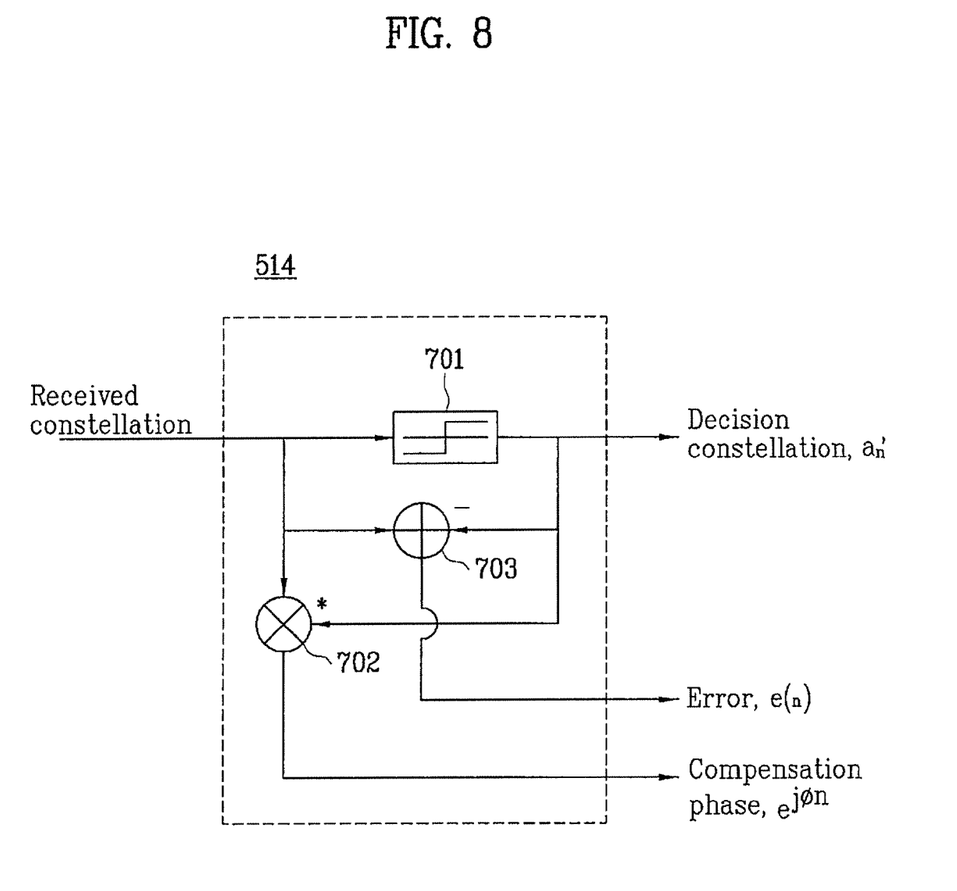
FIG. 8 is a detailed diagram illustrating the decision constellation/compensated phase/error generator.

Referring to FIG. 8, the decision constellation/compensation phase/error generator 513 includes: a sign extractor 701 for extracting a sign of an output constellation $r_n = Z_n e^{-j\Phi n}$ outputted from the phase tracer 511 to output as a decision constellation $a'_n$; a compensation phase generator 702 for conjugating an output signal of the sign extractor 701 and multiplying the conjugated signal by an input signal of the sign extractor 701 to generate a compensated phase $e^{j\Phi n}$; and an error generator 703 for outputting an error estimated value e(n) by subtracting an output signal of the sign extractor 701 from an input signal of the sign extractor 701.

The decision constellation/compensation phase/error generator 513 generates a decision constellation $a'_n$, a compensation phase $e^{j\Phi n}$, and an error estimated value e(n), respectively, from an output signal $r_n = Z_n e^{-j\Phi n}$ from the phase tracer 511.

The decision constellation $a'_n$, which is a component that does not have a distortion due to a phase, is inputted to the decision constellation phase compensator 512.

The compensation phase $e^{j\Phi n}$ is inputted to the phase tracer 511, and conjugated and multiplied by an output signal $Z_n = Z'_n e^{j\Phi n}$ of the adder 504 to generate an output signal $r_n = Z_n e^{-j\Phi n}$.

The compensation phase $e^{j\Phi n}$ is also inputted to the decision constellation phase compensator 512. The decision constellation phase compensator 512 multiplies the compensation phase $e^{j\Phi n}$ by the decision constellation $a'_n$ to generate a decision signal $a_n = a'_n e^{j\Phi n}$.

The error estimated value e(n) is inputted to the feedforward filter 501 and the feedback filter 502 to compensate an error from an input signal $y_n = y'_n e^{j\Phi n}$ currently received to the feedforward filter 501 and removes a portion where an inter-symbol interference occurs from a decision signal $a_n = a'_n e^{j\Phi n}$ inputted to the feedback filter 502.

The phase-compensation decision feedback channel equalizer compensates a phase of an input signal of the feedback filter 502 using the phase compensator 510 so that an input signal $a_n = a'_n e^{j\Phi n}$ of the feedback filter 502 may have the same phase as an input signal $y_n = y'_n e^{j\Phi n}$ of the feedforward filter 501, thereby providing constant ghost capturing/tracing performance regardless of a carrier frequency phase and a ghost phase and improving ghost removal performance.

As described above, the an-input signal $y_n = y'_n e^{j\Phi n}$ of the phase-compensation decision feedback channel equalizer is inputted to the feedforward filter 501 out of the phase as much as $e^{j\Phi n}$ by a carrier phase and a ghost phase, and a decision signal $a_n = a'_n e^{j\Phi n}$, which is an input of the feedback filter 502 is also inputted to the feedback filter 502 out of phase as much as $e^{j\Phi n}$. In addition, an output signal $Z_n = Z'_n e^{j\Phi n}$ of the adder 504 for adding the feedforward filter 501 to the feedback filter 502 maintains its out-of-phase as much as $e^{j\Phi n}$. After an output signal $Z_n = Z'_n e^{j\Phi n}$ of the adder 504 is multiplied by a conjugated value of the compensation phase $e^{j\Phi n}$ by the phase tracer 511, a phase distortion generated by a carrier and a ghost is finally compensated.

Figure 5:
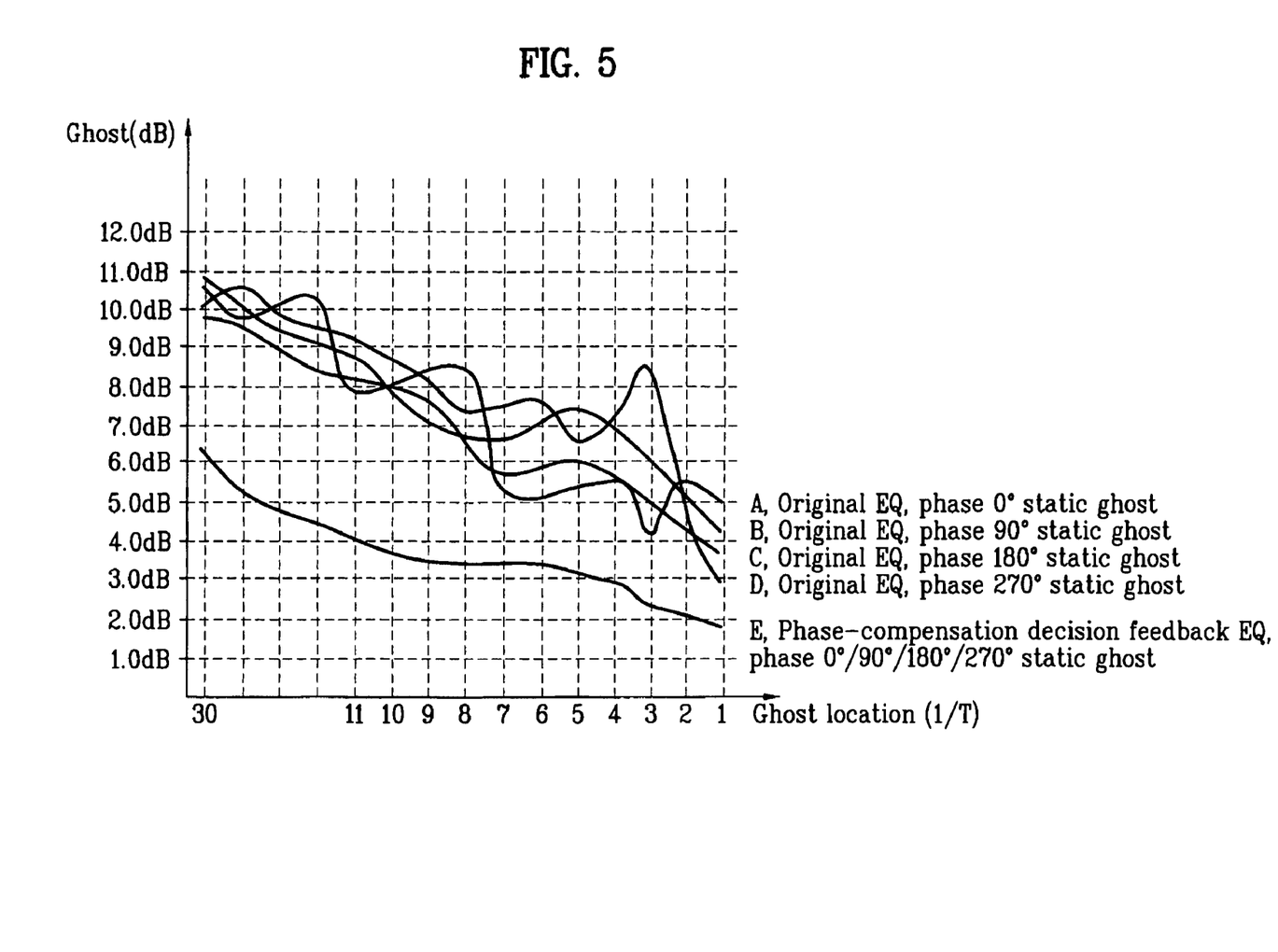
FIG. 5 is a graph comparing a ghost removal performance depending on a phase difference in a related art channel equalizer and the phase-compensation decision feedback channel equalizer of the present invention.

FIG. 5 is a graph showing a ghost removal performance depending on a phase difference in the channel equalizer of the related art and the phase-compensation decision feedback channel equalizer of the present invention.

Referring to FIG. 5, a graph E shows results of capture/tracing a relevant ghost using the phase-compensation decision feedback channel equalizer of the present invention and shows that the phase-compensation decision feedback channel equalizer always captures/traces a constant ghost regardless of a ghost phase.

On the contrary, the related art decision feedback channel equalizer shows a different ghost capture/tracing performance depending on a ghost phase and its performance is poor as a whole.

At this point, to recover a baseband signal where a residual carrier phase and a ghost phase exist together, it is required to make a phase of a decision signal, which is an input of the feedback filter 502 identical to that of an input signal of the feedforward filter 501, which is made possible by the phase compensator 510.

The phase compensator 510 multiplies a decision constellation $a'_n$ having no phase distortion by a compensation phase $e^{j\Phi n}$ to output the resulting signal to the feedback filter 502, SO that a decision signal $a_n=a'_n e^{j\Phi n}$ which is an input of the feedback filter 502 comes to have the same phase as an input signal of the feedforward filter 501 .comes to have the same phase as an input signal of the feedforward filter 501.

Here, a signal size of the decision constellation $a'_n$ is merely 5 bits. However, if the decision constellation $a'_n$ is multiplied by a compensation phase $e^{j\Phi n}$, a bit size is increased to 12 bits to express the compensation phase $e^{j\Phi n}$.

That is, a decision signal $a_n=a'_n e^{j\Phi n}$, which is an input of the feedback filter 502 is increased to 12 bits in its size, whereby the number of input signal use bits of the feedback filter 502 is increased when realizing a hardware.

SECOND EMBODIMENT

A phase-compensation decision feedback channel equalizer of a second embodiment will be described below in detail. The phase-compensation decision feedback channel equalizer of the second embodiment uses less number of bits for input signal of a feedback filter during maintaining an acquisition/tracing performance of ISI/ghost channel caused by a phase of a carrier wave and a ghost phase error. Therefore, the phase-compensation decision feedback channel equalizer of the second embodiment can prevent increase of hardware size caused by the number of tabs used in the feedback filter.

Figure 6:
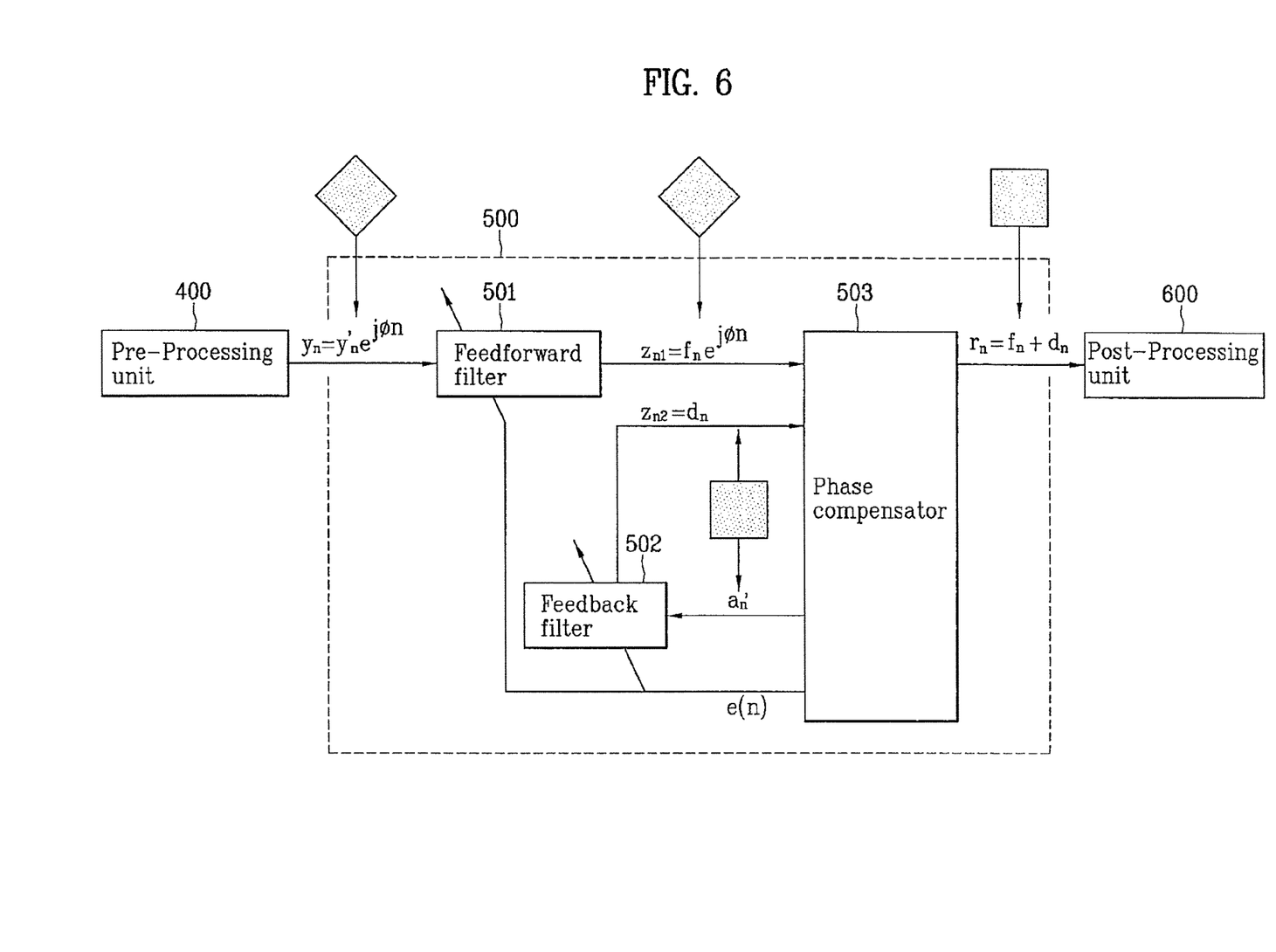
FIG. 6 is a diagram showing a digital broadcasting receiver having a phase-compensation decision feedback channel equalizer according to a second embodiment of the present invention.
Figure 7:
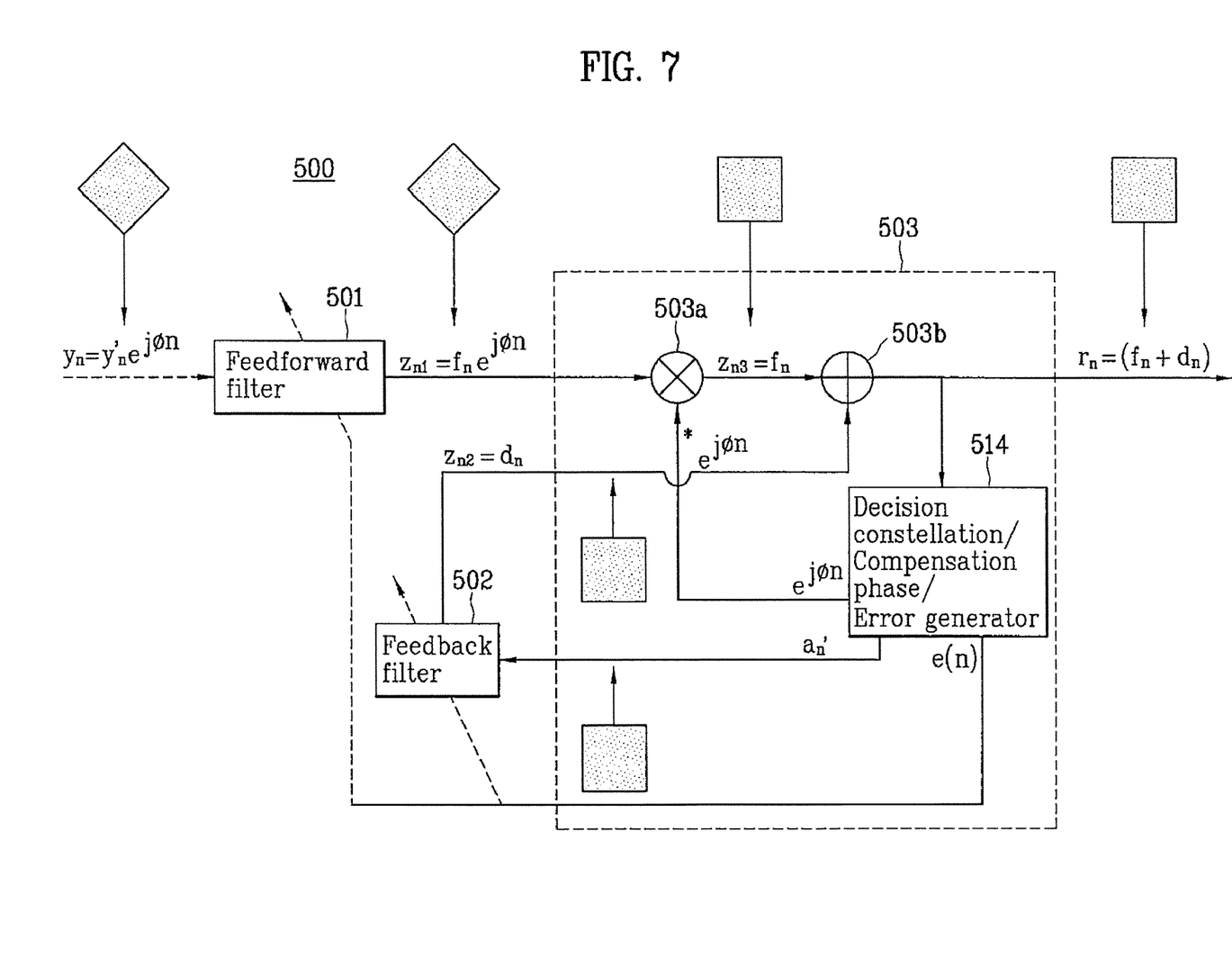
FIG. 7 is a circuit diagram of a phase compensator in FIG. 6.

FIG. 6 is a diagram showing a digital broadcasting receiver having a phase-compensation decision feedback channel equalizer according to a second embodiment of the present invention and FIG. 7 is a circuit diagram illustrating a phase compensator in FIG. 6.

Referring to FIGS. 6 and 7, the digital broadcasting receiver includes a pre-processing unit 400, a phase-compensation decision feedback channel equalizer 500 and a post-processing unit 600. The pre-processing unit 400 converts a passband digital signal to a baseband digital signal. The phase-compensation decision feedback channel equalizer 500 compensates an interference caused by a ghost and an NTSC signal, where the ghost is generated when the baseband signal is received and passed through a channel. The phase-compensation decision feedback channel equalizer 500 also compensates a bit detection error at a receiver side generated by the ghost and a main factor of a bit detection error causing an inter-symbol interference (ISI) at a signal passed through a multi-path. The post-processing unit 600 removes noise of a channel inputted at a rear end of the phase-compensation decision feedback channel equalizer 500 and recoveries a transmission symbol.

The phase-compensation decision feedback channel equalizer 500 includes a feed-forward filter 501, a feedback filter 502 and a phase compensator 503.

The feed-forward filter 501 eliminates an error of signal $y_n=y'_n e^{j\Phi n}$ inputted from the feedforward filter 501 by detecting the error from the previous input signal, and the feedback filter 502 eliminates a portion of the decision constellation $a_n$ where the ISI occurs.

The input signal $y_n=y'_n e^{j\Phi n}$ of the pre-processing unit 400 is distorted as much as $e^{j\Phi n}$ by the carrier wave and the ghost and inputted to the feed-forward filter 501 and the decision constellation $a'_n$ is inputted to the feedback filter 502 without distortion.

Accordingly, an output signal $Z_{n1}=f_n e^{j\Phi n}$ of the feed-forward filter 501 is tilted as much as $e^{j\Phi n}$ and inputted to the phase compensator 503, and an output signal $Z_{n2}=d_n$ of the feedback filter 502 is inputted to the phase compensator 503 without phase distortion.

The phase compensator 503 receives the output signal $Z_{n1}=f_n e^{j\Phi n}$ of the feed-forward filter 501 and the output signal $Z_{n2}=d_n$ of the feedback filter 502, generates an output signal $r_n=f_n+d_n$ and outputs the generated output signal $r_n=f_n+d_n$ to the post-processing unit 600. And, the phase compensator 503 generates the decision constellation $a'_n$ having no distortion caused by a phase and provides the decision constellation $a'_n$ to the feedback filter 502.

Furthermore, the phase compensator 503 generates an error estimation value e(n) of input signal and provides the generated error estimation value e(n) to the feed-forward filter 501 and the feedback filter 502.

The phase compensator 503 includes a phase tracer 503a, an adder 503b and a decision constellation/compensated phase/error generator 514.

The phase tracer 503a conjugates the compensated phase outputted from the decision constellation/compensated phase/error generator 514 and multiplies the conjugated phase to the output signal $Z_{n1}=f_n e^{j\Phi n}$ of the feed-forward filter 501.

That is, $Z_{n3}=Z_{n1}\times(e^{j\Phi n})^*$ is performed.

Since $Z_{n1}=f_n e^{j\Phi n}$, $Z_{n3}$ is become $f_n e^{j\Phi n}\times(e^{j\Phi n})^*=f_n$ and the phase distortion of the output signal of the phase tracer 503a is compensated and outputted.

The adder 503b adds the output signal $Z_{n3}=f_n$ of the phase tracer 503a and the output signal $Z_{n2}=d_n$ of the feedback filter 502, and output $r_n=f_n+d_n$ to the post-processing unit 600.

In here, the output signal $Z_{n3}=f_n$ of the phase tracer 503a and the output signal $Z_{n2}=d_n$ of the feedback filter 502 are signal having a constellation having no distortion caused by the phase. Therefore, the output signal $r_n$, also has a constellation having no distortion caused by the phase.

The decision constellation/compensated phase/error generator 514 generates a decision constellation $a'_n$, a compensated phase $e^{j\Phi n}$, and error estimation value e(n) from the output signal $r_n$ of the adder 503b.

The decision constellation $a'_n$ is a signal having no distortion caused by the phase. The decision constellation $a'_n$ is inputted to the feedback filter 502 and a portion of the decision constellation $a'_n$, where the ISI is occurred, is eliminated by the feedback filter 502.

The compensated phase $e^{j\Phi n}$ is inputted to the phase tracer 503a, conjugated, and multiplied to the output signal $Z_{n1}=f_n e^{j\Phi n}$ of the feed-forward filter 501 to generate $Z_{n3}=f_n e^{j\Phi n}\times(e^{-j\Phi n})^*=f_n$.

The error estimation value e(n) is inputted to the feed-forward filter 501 and the feedback filter 502 and is used for compensating the input signal $y_n=y'_n e^{j\Phi n}$ of the pre-processing unit 400 and for eliminating a portion of the decision constellation $a'_n$, where the ISI is occurred.

As mentioned above, the phase-compensation decision feedback channel equalizer eliminates a phase distortion of the received signal by using the feed-forward filter 501 and adds the phase distortion eliminated signal and the output signal of the feedback filter 502. Therefore, the output signal of the feedback filter 502 does not include the phase distortion.

Accordingly, the decision constellation a'$_n$ of the feedback filter 502 must not include the phase distortion.

The decision constellation a'$_n$ can be represented by using 5 bits. Accordingly, the input signal of the feedback filter 502 can be represented by using 5 bits.

Therefore, the feedback filter 502 of the second embodiment uses fewer bits (5 bits) for representing the input signal of the feedback filter 502 of the first embodiment which uses 12 bits. Therefore, the second embodiment can prevent increase of hardware size caused by using the number of tabs in feedback filter.

FIG. 8 is a detailed diagram illustrating the decision constellation/compensated phase/error generator.

As shown in FIG. 8, the decision constellation/compensated phase/error generator 514 includes a sign extractor 701, a compensated phase generator 702 and an error generator 703. The sign extractor 701 extracts a sign of constellation $r_n=f_n+d_n$ outputted from the adder 503b and output the extracted sign as the decision constellation a'$_n$. The compensated phase generator 702 generates a compensated phase $e^{j\Phi n}$ by conjugating the output signal of the sign extractor 701 and multiplying the conjugated signal and the input signal of the sign extractor 701. The error generator 703 outputs the error estimation value e(n) by subtracting the output signal of the sign extractor 701 from the input signal of the sign extractor 701.

The decision constellation a'$_n$ outputted from the sign extractor 701 is a constellation having no distortion caused by the phase and it is inputted to the feedback filter 502.

In here, the sign extractor 701 may includes a limiter.

The compensated phase $e^{j\Phi n}$ outputted from compensated phase generator 702 is conjugated by the phase tracer 503a and multiplied with the input signal $Z_{n1}=f_n e^{j\Phi n}$ of the feedforward filter 501.

That is, $Z_{n1} \times (e^{j\Phi n})^*$ is performed.

Since $Z_{n1}=f_n e^{j\Phi n}$, the phase tracer 503a outputs a signal $f_n e^{j\Phi n} \times (e^{j\Phi n})^* = f_n$.

The error estimation value e(n) outputted from the error generator 703 is inputted to the feed-forward filter 501 and the feedback filter 502. In the feed-forward filter 501, the input signal is compensated based on the error estimated value and in the feedback filter 502, the decision constellation is compensated based on the error estimated value.

Figure 9:
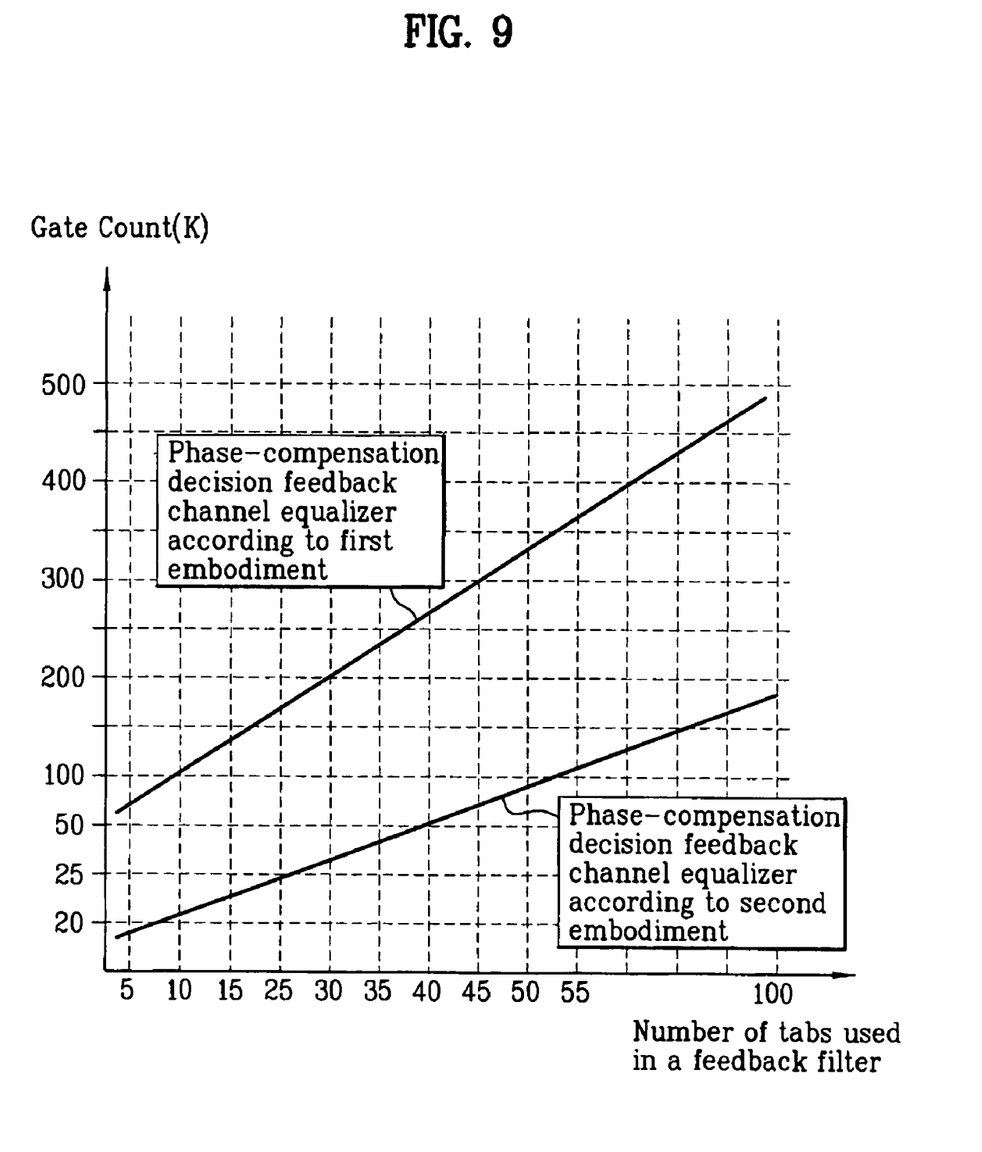
FIG. 9 is a graph showing comparison between a hardware size of a phase-compensation decision feedback channel equalizer of the present invention and a hardware size of a conventional phase-compensation decision feedback channel equalizer.

FIG. 9 is a graph showing comparison between a hardware size of a phase-compensation decision feedback channel equalizer of the present invention and a hardware size of a conventional phase-compensation decision feedback channel equalizer.

As shown in FIG. 9, in case of identical number of tabs used in a feedback filter, the hardware size of the second embodiment is two time smaller than the hardware size of the first embodiment.

The detailed applicable area of the phase-compensation decision feedback channel equalizer of the present invention is a single QAM cable digital receiver, a single QPSK phase digital receiver, a single 8PSK digital receiver, a multi QAM cable digital receiver, a multi QPSK satellite digital receiver, a multi 8PSK satellite digital receiver and VSB ground wave digital receiver.

The phase-compensation decision feedback channel equalizer of the present invention has following effects.

The present invention is constructed for eliminating a phase distortion of signal received from the feed-forward filter 501 through the phase tracer 503a and adding the phase distortion eliminated signal with the output signal of the feedback filter 502.

Accordingly, the output signal of the feedback filter 502 must have a constellation identical to a constellation of the output signal of the phase tracer 503a for providing constant ghost acquisition/tracing performance without regard to a frequency phase of a carrier wave and a phase of the ghost. That is, the output signal of the feedback filter 502 must not include a distortion caused by the phase.

Furthermore, in case of the second embodiment, the decision constellation a'$_n$ does not include the phase distortion. Accordingly, a phase distortion element is not necessary to be represented and the decision constellation a'$_n$ requires 5 bits to be represented. Therefore, an input signal of the feedback filter 502 also requires 5 bits for representing the input signal.

That is, the bits of input signal in the feedback filter of the first embodiment (12 bits) are reduced to 5 bits. Therefore, a hardware size of the phase compensator in FIG. 7, which is increased by the number of tab used, is reduced to more than half comparing to the first embodiment.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A phase-compensation decision feedback channel equalizer, comprising:
   a feedforward filter for removing an error detected from a current input signal having a phase distortion;
   a feedback filter for removing an inter-symbol interference from a decision constellation that is an estimated value of the current input signal; and
   a phase compensator for generating the decision constellation having the same phase as the current input signal and generating an output signal, the output signal comprising a phase compensated combination of an output signal of the feedback filter and an output signal of the feedforward filter.

2. The phase-compensation decision feedback channel equalizer of claim 1, wherein the phase compensator multiplies the decision constellation having no phase distortion by a compensation phase to generate a multiplied signal and outputs the multiplied signal to the feedback filter in order to allow the feedback filter to output a decision constellation signal having the phase distortion, and further comprising an adder for adding the output signal of the feedback filter and the output signal of the feedforward filter.

3. The phase-compensation decision feedback channel equalizer of claim 1, wherein, a size of the decision constellation input to the feedback filter is 12 bits.

4. The phase-compensation decision feedback channel equalizer of claim 1, wherein the phase compensator multiplies the decision constellation by a compensation phase and outputs a decision signal to the feedback filter.

5. The phase-compensation decision feedback channel equalizer of claim 1, wherein the phase compensator includes:
   a phase tracer for removing the phase distortion from the output signal of the feedforward filter;
   a decision constellation/compensation phase/error generator for generating a compensation phase to compensate the phase distortion contained in the output signal of the feedforward filter, the decision constellation and an error estimated value from an output signal of the phase tracer; and a decision constellation phase compensator for multiplying the compensation phase by the decision constellation to generate a decision signal, the generated decision signal having the same phase distortion as the current input signal to the feedforward filter, and providing the generated decision signal to the feedback filter.

6. The phase-compensation decision feedback channel equalizer of claim 5, further comprising:

an adder for adding the output signal of the feedforward filter to the output signal of the feedback filter to generate an added signal and outputting the added signal to the phase tracer.

7. The phase-compensation decision feedback channel equalizer of claim 6, wherein the phase tracer conjugates the compensation phase outputted from the decision constellation/compensation phase/error generator and multiplies a conjugated value of the compensation phase by the added signal.

8. A phase-compensation decision feedback channel equalizer, comprising:

a feedforward filter for removing an error detected from a current input signal having a phase distortion and outputting an error removed signal;

a feedback filter for removing an inter-symbol interference from a decision constellation that is an estimated value of the current input signal and outputting the decision constellation from which the inter-symbol interference is removed; and a phase compensator for removing the phase distortion from an output signal of the feedforward filter by using the same phase as a constellation of the output signal of the feedforward filter, adding an output signal of the feedback filter to the output signal of the feedforward filter to generate an added signal from which the phase distortion is removed and outputting the decision constellation to the feedback filter.

9. The phase-compensation decision feedback channel equalizer of claim 8, wherein the phase compensator generates an error estimated value from the added signal and outputs the error estimated value to the feedforward filter and the feedback filter.

10. The phase-compensation decision feedback channel equalizer of claim 8, wherein the phase compensator includes:

a phase tracer for removing the phase distortion from the output signal of the feedforward filter;

an adder for adding the phase distortion removed signal from the phase tracer to the decision constellation from the feedback filter to generate an added signal and outputting the added signal; and a decision constellation/compensation phase/error generator for generating a compensation phase to compensate the phase distortion contained in the output signal of the feedforward filter, the decision constellation and an error estimated value from an output signal of the adder.

11. The phase-compensation decision feedback channel equalizer of claim 10, wherein the phase tracer conjugates the compensation phase outputted from the decision constellation/compensation phase/error generator and multiplies a conjugated value of the compensation phase by the output signal of the feedforward filter.

12. The phase-compensation decision feedback channel equalizer of claim 10, wherein the decision constellation/compensation phase/error generator includes:

a sign extractor for extracting a sign of the output signal of the adder whose phase distortion is removed to generate the decision constellation;

a compensation phase generator for conjugating the decision constellation and multiplying a conjugated value of the decision constellation by the added signal to generate the compensation phase; and an error generator for subtracting an output signal of the sign extractor from the output signal of the adder to generate the error estimated value.

13. The phase-compensation decision feedback channel equalizer of claim 12, wherein the sign extractor is configured with a limiter.

14. The phase-compensation decision feedback channel equalizer of claim 8, wherein a size of the decision constellation inputted to the feedback filter is 5 bits.

* * * * *